P. BAMMER.
HEEL CUTTING APPARATUS.
APPLICATION FILED JUNE 25, 1917.
1,267,306.
Patented May 21, 1918.
Fig. 1.
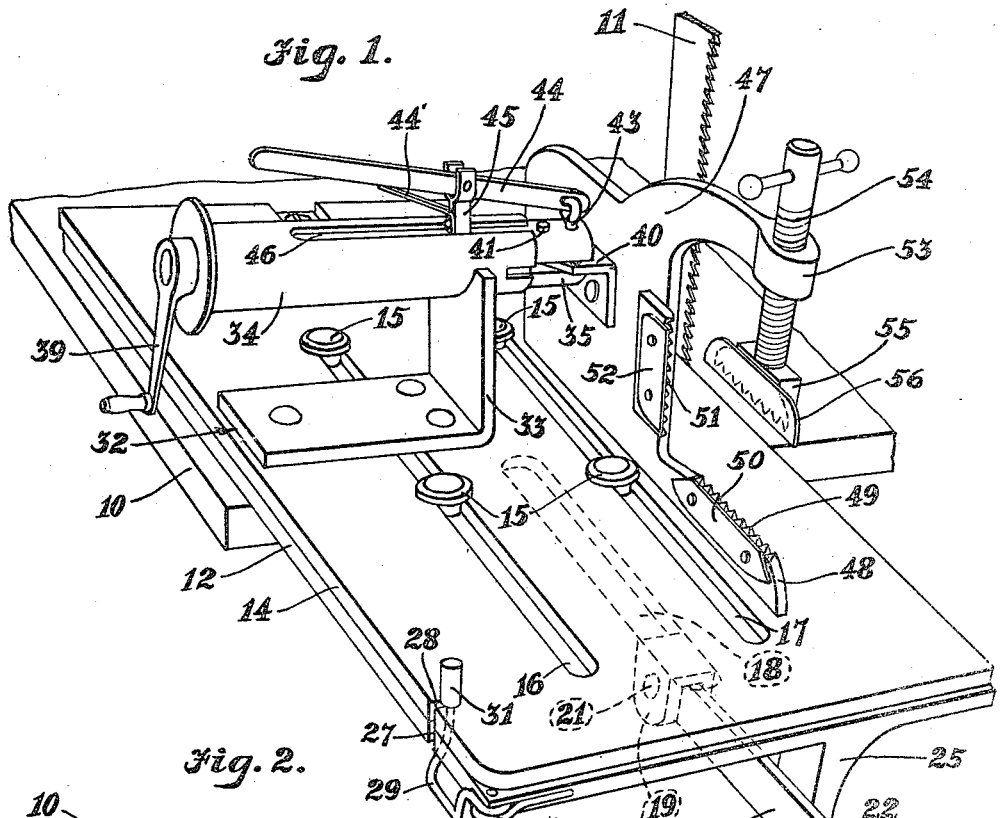
Fig. 2.
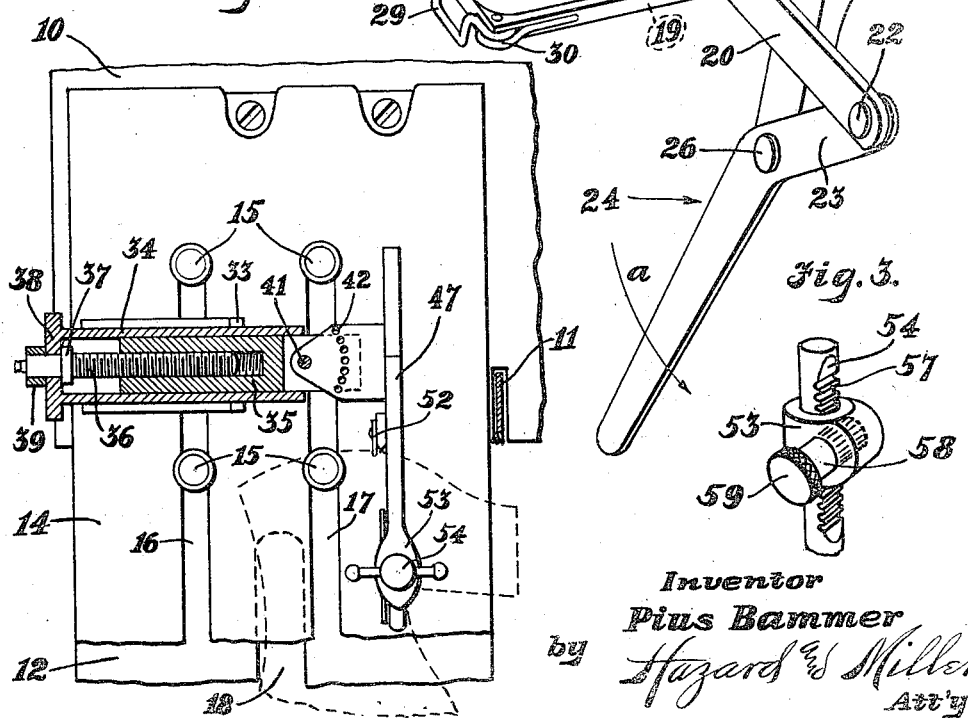
Fig. 3.
Inventor
Pius Bammer
by Hazard & Miller
Att'ys.

UNITED STATES PATENT OFFICE.

PIUS BAMMER, OF LOS ANGELES, CALIFORNIA.

HEEL-CUTTING APPARATUS.

1,267,306.
Specification of Letters Patent.
Patented May 21, 1918.

Application filed June 25, 1917. Serial No. 176,811.

*To all whom it may concern:*

Be it known that I, PIUS BAMMER, a subject of the Emperor of Germany, residing at Los Angeles, in the county of Los Angeles and State of California, have invented new and useful Improvements in Heel-Cutting Apparatus, of which the following is a specification.

This invention relates to shoe machinery and particularly pertains to a device for cutting the heels of shoes.

It is the principal object of this invention to provide a machine for cutting shoe heels which will securely clamp the shoe and permit it to be rapidly fed against the cutting edge of a saw without danger to the operator.

Another object of this invention is to provide a simple grip by which the shoe may be clamped within the device and against horizontal, or vertical movement.

Another object of this invention is to provide means whereby the shoe, when clamped, may be easily adjusted horizontally in relation to the saw blade.

Another object of this invention is to provide means for permitting the shoe to be clamped at an angle to the cutting blade.

Another object of this invention is to provide a simple locking mechanism whereby the feed table may be secured against movement while the shoe is being clamped thereupon, and which will permit the table to be readily released when the cut is to be made.

It is a further object of this invention to provide a shoe cutting machine of the above class which is composed of few parts, all of which are strongly designed and are not liable to become easily broken or worn.

Other objects will appear hereinafter.

The invention is illustrated, by way of example, in the accompanying drawings in which:

Figure 1 is a view in perspective illustrating the complete cutting machine.

Fig. 2 is a fragmentary view in section and plan illustrating the vital elements of the machine and particularly disclosing, by dotted lines, the shoe which is clamped therein.

Fig. 3 is a fragmentary view in perspective illustrating a modified form of the heel clamping adjustment member.

Referring more particularly to the drawings, 10 indicates a bench, or table, preferably forming a part of a band saw frame through which a saw blade 11 passes vertically. Mounted upon this table is a carriage block 12 upon which a slidable carriage 14 is mounted. This block is fitted with a series of up-standing pins 15 by which the carriage is slidably secured upon the block. These pins extend through parallel slots 16 and 17 formed lengthwise of the carriage for a purpose which will be readily understood. A slot 18 is formed through the carriage block and midway between the slots 16 and 17 with which it is parallel. A lug 19 extends downwardly from the carriage through this slot and is provided as a mounting for the forward end of a shifting link 20 with which it is connected by a pin 21. The outer end of the link is provided with a pin 22 which connects it with the upwardly extending arm 23 of a shifting lever 24. The lever 24 is pivotally fixed to a bracket 25 forming a part of the carriage block. These parts are secured in pivotal relation to each other by means of the pivot pin 26. It will thus be seen that by moving the shifting lever, the carriage may be horizontally slid in relation to the carriage block. A small recess 27 is formed through the carriage block and may be brought to register with a recess 28 formed through the edge of the carriage plate. A lock member 29 is adapted to extend through both of said recesses and normally hold the carriage immovable in relation to the carriage block. This member is formed with a spring shank 30 which yieldably holds it within the recess and permits it to be removed therefrom by pressure upon the thumb piece 31.

Permanently mounted upon the carriage plate is an angular bracket 32 which is held in place by rivets and has a perpendicularly extending leg 33. This leg is adapted to support a bearing sleeve 34 within which a horizontally slidable adjusting shaft 35 is placed. The shaft is internally threaded throughout a portion of its length and is adapted to receive an adjusting screw 36 having a collar 37 which bears against an end wall 38 of the sleeve. A shank extends outwardly through the collar and is engaged by a crank 39. It is evident that by rotation of the crank, the adjusting screw 36 will cause the adjusting shaft 35 to be horizontally reciprocated transversely of the carriage.

The shaft 35 is slit transversely of the unthreaded end to receive a fastening member 40 which is adapted to swing through the slot and is held in pivotal position by means of a vertical pivot pin 41, thus moving throughout a horizontal plane. A series of perforations 42 are formed upon the face of the fastening member 40 and accurately arranged in relation to the pivot pin 41. These perforations are adapted to separately receive a lock pin 43 which extends through a vertical opening in the upper portion of the adjusting shaft 35. An eye is formed upon the pin 43 and adapted to connect the pin with a lifting lever 44. This lever is pivotally mounted upon a bracket 45 secured to the upper face of the shaft 35 and adapted to move along a longitudinal slot 46 in the tubular bearing member 34.

The fitting 40 is fastened to the side of a clamping plate 47 which is maintained in an upright position and which extends vertically and longitudinally of the carriage. This plate is adapted to slide transversely of the carriage when actuated by the movement of the shaft 35. An extension jaw 48 is formed along the under side of this plate and has a series of corrugations 49 adapted to bear against the side of the heel of a shoe to be clamped. A clamping blade 50 also is secured to this member to more positively grip the shoe. Along the vertical edge of the clamping plate are corrugated faces 51 and a clamping blade 52, serving the same purpose as the previously described clamping members. An over-hanging arm 53 is formed as a part of the clamping plate and has an enlargement which is internally threaded to receive an adjusting screw 54. To the lower end of the adjusting screw are mounted a pivotally supported clamping jaw 55 and a clamping blade 56. These members are in the same planes as the previously mentioned clamping members and are super-imposed in vertical alinement with the members 48 and 50.

In the modified form of the adjusting screw, as shown in Fig. 3, the screw 54 is slidably mounted within the arm 53 and is formed along one side with a gear rack 57 which is in mesh with gear teeth formed upon a shaft 58. This shaft extends at right-angles to the screw 54 and may be rotated to raise and lower the screw by means of a hand wheel 59.

In operation, the heel of the shoe which is to be cut is placed between the horizontally extending jaw 48 and the adjustable jaw 55 which is above it. The end of the heel is then placed against the vertical jaw 51, after which the screw 54 is drawn down to clamp the heel in position. The shoe is then horizontally adjusted in relation to the carriage and saw blade 11 by rotation of the crank 39 which causes the entire clamping plate 47 to move toward or away from the saw blade, as desired. It will be noted that the shoe will be rigidly held by the combined action of the clamping jaws and blades, and this will insure that the cut made by the saw will be straight and will follow the line intended, irrespective of the inclination of the heel thereto. When the shoe has been thus positioned, the lever 44 may be actuated to raise the pin 43 and the heel placed in any angular relation to the saw, after which the pin 43 may be again dropped into one of the recesses 42 and there held by a spring 44'. The locking member 29 may then be swung out of the recesses 27 and 28, and by drawing the shifting lever 24 forward in the direction of the arrow —a—, in Fig. 1, the carriage will be moved toward the saw blade and will feed the heel against the saw, thus completing the cutting operation.

It will thus be seen that the device here disclosed is simple and that the parts are durable and easily operated, as well as adjusted to provide any angle and depth of cut desired through a heel.

While I have shown the preferred construction of my heel cutting apparatus as now known to me, it will be understood that various changes in the combination, construction and arrangement of parts may be made by those skilled in the art without departing from the spirit of my invention.

I claim:

1. A heel cutting machine, comprising a fixed carriage base, a carriage positioned upon said base and alongside a vertically moving saw blade, lever operated means for shifting the carriage to cause it to move alongside the saw blade, a screw operated clamping member positioned upon said carriage, and screw operated means whereby said clamping member may be adjusted transversely of the carriage, the clamping member being adjustably mounted so that it can be positioned horizontally at different angles to the carriage and saw blade.

2. A heel cutting machine, comprising a fixed carriage base, a carriage positioned upon said base and alongside a vertically moving saw blade, lever operated means for shifting the carriage to cause it to move alongside the saw blade, a screw operated clamping member positioned upon said carriage, screw operated means whereby said clamping member may be adjusted transversely of the carriage, the clamping member being adjustably mounted so that it can be positioned horizontally at different angles to the carriage and saw blade, and means whereby the carriage base and the carriage may be locked against movement in relation to each other, when desired.

3. A heel cutting machine, comprising a fixed carriage base, a carriage positioned upon said base and alongside a vertically moving saw blade, lever operated means for shifting the carriage to cause it to move alongside the saw blade, a screw operated clamping member positioned upon said carriage, screw operated means whereby said clamping member may be adjusted transversely of the carriage, the clamping member being adjustably mounted so that it can be positioned horizontally at different angles to the carriage and saw blades, and means whereby the clamping member may be locked in its angularly adjusted position.

4. A heel cutting machine comprising a fixed base having a longitudinally extending slot formed therethrough, a carriage plate slidably mounted upon the base, lugs extending downwardly from the carriage plate and through the slot, an operating lever in connection with said lugs whereby the carriage plate may be moved along a path of travel upon the base, said carriage plate having parallel guide slots formed therethrough, sets of guide pins on said base positioned within said guide slots, a clamping plate mounted upon the carriage plate, a pair of fixed clamping jaws formed upon said clamping plate, an adjustable clamping jaw supported by said plate, and means for moving the clamping plate laterally of the carriage, said plate being adjustable so that it can be positioned at different angles to the path of travel of the carriage.

5. A heel cutting machine comprising a fixed base having a longitudinally extending slot formed therethrough, a carriage plate slidably mounted upon the base, lugs extending downwardly from the carriage plate and through the slot, an operating lever in connection with said lugs whereby the carriage plate may be moved along a path of travel upon the base, said carriage plate having parallel guide slots therethrough, sets of guide pins on said base positioned within said guide slots, a clamping plate mounted upon the carriage plate, a pair of fixed clamping jaws formed upon said clamping plate, an adjustable clamping jaw supported by said plate, means for moving the clamping plate laterally of the carriage, said plate being adjustable so that it can be positioned at different angles to the path of travel of the carriage, and a catch member adapted to normally hold the carriage plate and base in fixed relation to each other.

6. A heel cutting machine comprising a fixed base having a longitudinally extending slot formed therethrough, a carriage plate slidably mounted upon the base, lugs extending downwardly from the carriage plate and through the slot, an operating lever in connection with said lugs whereby the carriage plate may be moved along a path of travel upon the base, said carriage plate having parallel guide slots formed therethrough, sets of guide pins on said base positioned within said guide slots, a clamping plate mounted upon the carriage plate, a pair of fixed clamping jaws formed upon said clamping plate, an adjustable clamping jaw supported by said plate, a fixed bracket secured upon the carriage plate, a bearing sleeve held horizontally by the bracket, an adjusting shaft slidably mounted within said sleeve and formed with a longitudinally extending threaded bore, an adjusting screw adapted to be positioned within the shaft, means whereby rotation of said screw will cause the shaft to be advanced or retracted, a bracket pivotally connected to the end of the shaft and fixed to the side of the clamping plate, said bracket having holes through it arranged along the arc of a circle described from the pivotal connection of the bracket, and a lock pin adapted to be removably positioned within the holes to hold the clamping plate at a desired angle to its path of travel.

In testimony whereof I have signed my name to this specification.

PIUS BAMMER.

Copies of this patent may be obtained for five cents each, by addressing the "Commissioner of Patents, Washington, D. C."